United States Patent [19]

Stevens et al.

[11] Patent Number: 4,821,291

[45] Date of Patent: Apr. 11, 1989

[54] IMPROVEMENTS IN OR RELATING TO SIGNAL COMMUNICATION SYSTEMS

[76] Inventors: John K. Stevens, Brampton; Paul I. Waterhouse, Lynden, both of Canada

[21] Appl. No.: 909,548

[22] Filed: Sep. 22, 1986

[51] Int. Cl.[4] .................. H04L 27/00; H04L 27/18
[52] U.S. Cl. .................. 375/37; 340/825.73; 455/57; 358/144
[58] Field of Search ............ 375/37, 38, 65, 66; 455/59, 60, 104, 61, 105, 46, 51, 41, 70, 57; 340/825.73, 825.74; 370/74, 121; 381/4; 358/12, 16, 144, 19

[56] References Cited

U.S. PATENT DOCUMENTS

| | | | |
|---|---|---|---|
| 1,790,486 | 9/1927 | Roberts | 455/46 |
| 1,818,669 | 8/1931 | Beckmann | 455/57 |
| 2,028,212 | 1/1936 | Heising | 455/53 |
| 2,154,923 | 4/1939 | Walter | 455/57 |
| 2,719,284 | 9/1955 | Roberts et al. | 455/57 |
| 3,040,315 | 6/1962 | Kramer | 455/59 |
| 4,002,886 | 1/1977 | Sundelin | 235/61 |
| 4,028,537 | 6/1977 | Snow | 235/383 |
| 4,339,772 | 1/1982 | Eilers et al. | 358/144 |
| 4,500,880 | 2/1985 | Gomersall et al. | 340/825.35 |
| 4,521,677 | 6/1985 | Sarwin | 235/385 |

*Primary Examiner*—Robert L. Griffin
*Assistant Examiner*—Marianne Huseman
*Attorney, Agent, or Firm*—Rogers & Scott

[57] ABSTRACT

The invention comprises a low power broadcast system that is applicable especially to the so-called "electronic shelf" for retail stores, wherein the shelf edge carries price displaying modules that can be addressed and controlled from a central computer operated station. The system also permits the modules to broadcast back to the central station to confirm safe receipt of data and to give information as to stock levels, etc. A broadcast system avoids the need for wiring so that location changes are facilitated. To overcome the extremely noisy environment and to conserve power consumption, and hence battery life, the system employs a low frequency (132 kHz) reference carrier transmitted by the base station in discrete segmented packages, each of which frames a base data word transmitted by the base station and a corresponding module data word transmitted by the module a fixed period after the end of the base word; the base receiver then has precise time information for receipt of the module word and can "look" for it among the noise. The carrier received by the module is divided and the lower frequency used to demodulate the information-carrying transmission from the base station of the same frequency, avoiding the need for a phase locked loop detector; this lower frequency is also used for the module transmission. The module employs an air-cored loop antenna coil for the lower frequency and a ferrite-cored loop antenna for the higher reference frequency, while the store antenna is segmented for selection of the group of modules to be addressed; the antenna contacts the metal shelving to provide electromagnetic coupling thereto. Each module contains a microprocessor which controls the operation. Each module has "concealed" buttons which can be enabled and used to insert data to be transmitted therefrom. A charging circuit can be used as the power source employing the received RF carrier energy.

26 Claims, 11 Drawing Sheets

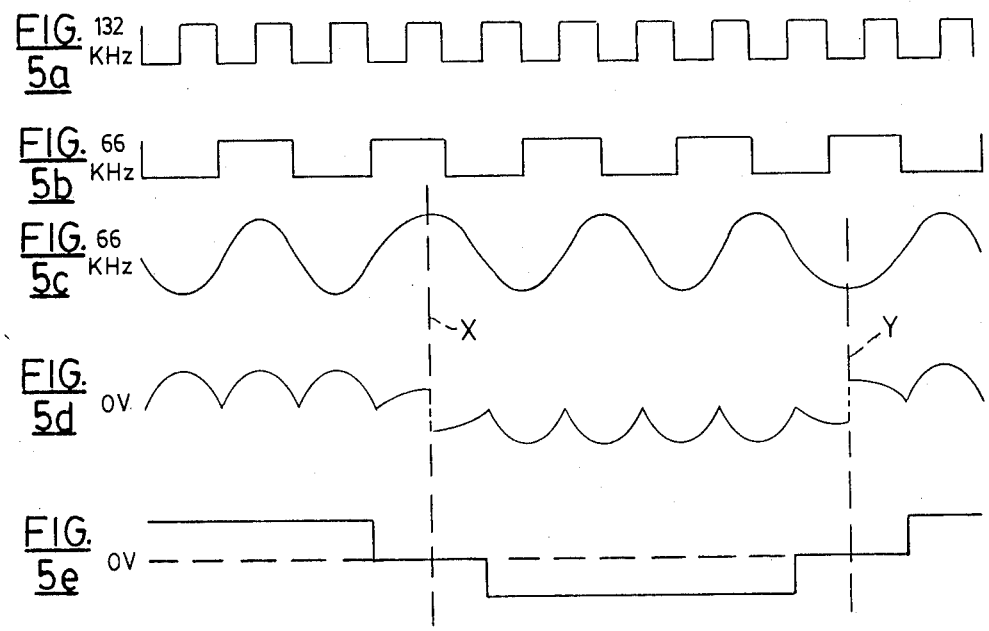
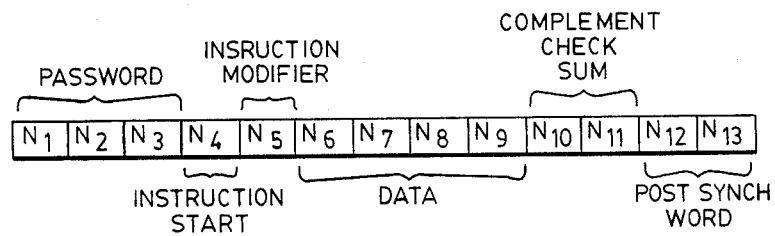
FIG.6
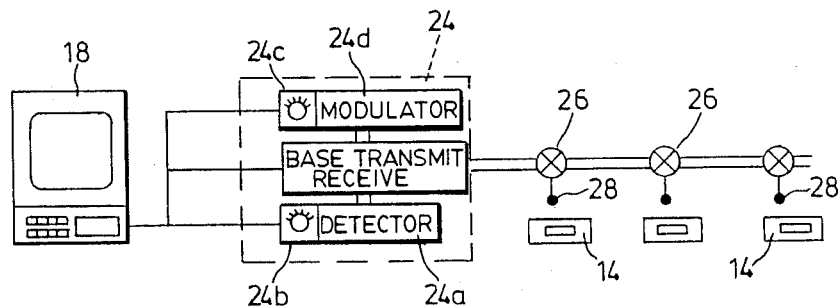
FIG.8

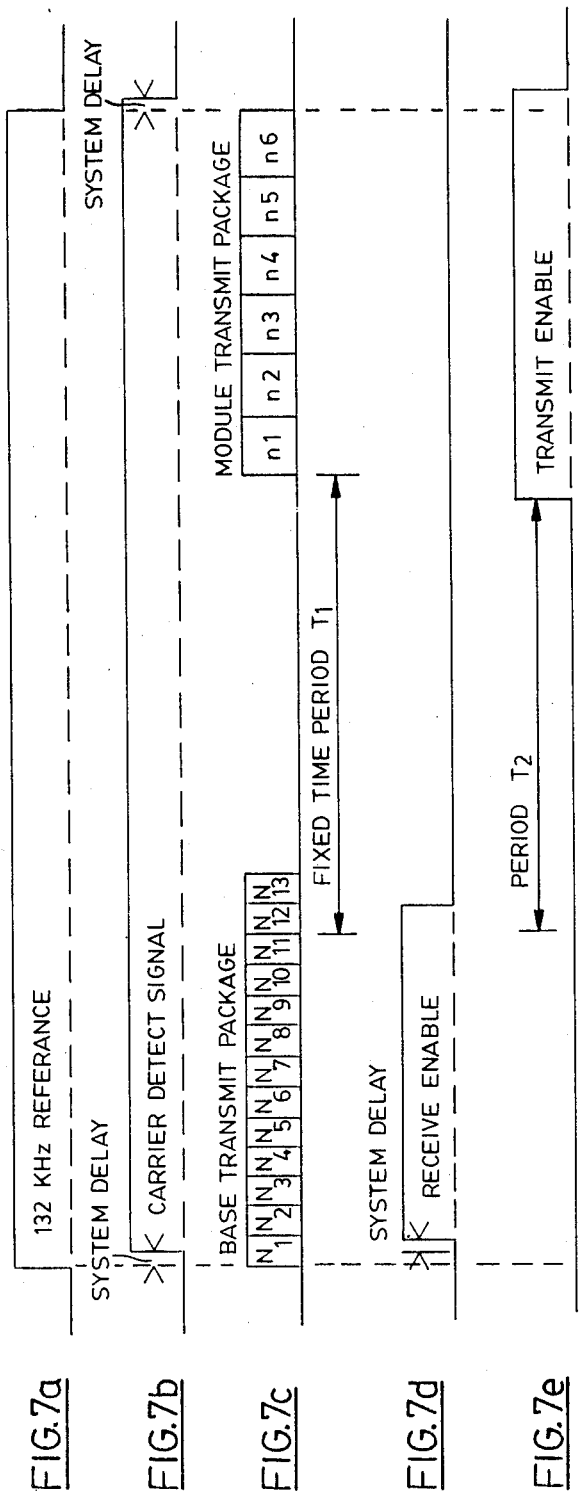

* GOOD RECEPTION
+ INCORRECT DATA RECEIVED
o NO RECEPTION

IMPROVEMENTS IN OR RELATING TO SIGNAL COMMUNICATION SYSTEMS

FIELD OF THE INVENTION

The present invention is concerned with improvements in or relating to signal broadcast communication systems, and in particular to a new low power system providing broadcast communication between a number of individual display modules and a central base station transmitting information to the modules and also receiving information therefrom.

REVIEW OF THE PRIOR ART

There have been a number of prior proposals to automate in some way the provision of item price information in a retail grocery store. Such a system is attractive to store operators because of the economic benefits that result, for example,, from reduction or elimination of the labour costs associated with maintaining the shelf labels and signs up-to-date; reducing or eliminating the need to provide price tags on the individual items; reducing or eliminating loss on stock due to price change lags and the difficulty of quickly repricing a large number of individually priced items; and to permit optimization of price distribution in the store with the possibility of rapid and economical provision of time limited specials To this end there have been a number of proposals for such systems.

Several important technical problems have prevented the cost effective development of such systems For example, the shelves that are now used in most retail industries are constantly being rearranged. Any direct wiring therefore becomes an expensive impracticality. Moreover, cost considerations make it important that individual display modules be priced low, and expensive anti-fretting gold connectors used to connect the modules to the wiring would overprice the units. Nevertheless, much effort has been focused on the creation of clever connectors, and wiring schemes as the solution. Wireless systems including infrared, acoustic and radio broadcast have been proposed, but most have assumed that such a system would simply be too unreliable for transmitting important pricing and merchandising information.

U.S. Pat. No. 4,002,886, issued to Sundelin, discloses an "electronic shelf" consisting of modules that are attached to the front edge of the shelf and supplied by wire connections with the data required for display It teaches that as an alternative to wiring each of 10,000 or more modules directly to the master computer, a simple address decoding system could be used where a unique address is first transmitted followed by the data. Each module in turn has its own unique address and, if the transmitted address corresponds to the module address, then the data is accepted by the module U.S. Pat. No. 4,028,537, issued in 1977 to N.C.R., proposes that a serial addressing scheme be used. Each module is serially connected to the next module similar to a Christmas tree string of lights, and they propose that address decoding be accomplished by subtracting 1 from the current number before sending it on to the next module. The module that receives a zero accepts the data as being its own.

U.S. Pat. No. 4,500,880 issued in February 1985 to Motorola and proposes that the UPC code used as the address, in place of an arbitrary number.

DEFINITION OF THE INVENTION

In accordance with the present invention there is provided a signal broadcast system comprising a transmitter and at least one receiver, the system comprising:

means for generating at the transmitter a first carrier of a first reference frequency N and for broadcasting that first carrier;

means for generating at the transmitter a second carrier of second frequency N/n derived from the first reference carrier where the divisor n is greater than 1, for modulating the second carrier with a digital modulating signal in accordance with digital information to be transmitted thereby, and for broadcasting the digitally modulated second carrier;

means at the receiver for receiving the first carrier and for dividing it by the divisor n to produce a corresponding demodulating signal of frequency N/n; and a demodulator at the receiver receiving the second digitally modulated carrier and the demodulating signal and demodulating the second digitally modulated carrier with the said demodulating signal to generate a resulting digital information signal.

Preferably the transmitter is a base transmitter and also comprises receiving means for receiving said first and second carriers, and the receiver is a module receiver and also comprises means for generating first and second carriers respectively of reference frequencies N and N/n and for transmitting said carriers, wherein the said first carrier is generated at the base transmitter and transmitted therefrom in the form of sequential discrete envelopes;

the base transmitter when transmitting generates a base data word to be transmitted modulates the second carrier therewith and transmits the resultant modulated second carrier within the respective envelope;

the receiving means at the module receiver detects the base data word and in response to its termination generates a timing period interposed between the received base data word and an associated module data word to be transmitted by the module receiver;

the transmitting means at the module receiver modulates the second carrier with the module data word and transmits the resultant modulated second carrier at the termination of the timing period.

Also in accordance with the invention there is provided a signal communication system comprising a base transmitter including transmitting means and also including receiving means, and comprising a plurality of module receivers, each of which includes a respective receiving means and also a respective transmitting means;

the transmitting means of the base transmitter including means for generating a first carrier of a first reference frequency N and for transmitting that first carrier respectively to the receiving means of the module receivers;

each transmitting means of the base transmitter and the module receiver also including means for generating when transmitting a second carrier of second frequency N/n derived from the first reference carrier, where the divisor n is greater than 1, means for modulating the respective second carrier with a respective digital modulating signal in accordance with digital information to be transmitted respectively from the base transmitter and the module receivers, and means for transmitting the digitally modulated second carrier therefrom;

dividing means at each receiving means receiving the first carrier from the respective transmitting means and dividing it by the divisor n to produce a corresponding demodulating signal of frequency N/n; and a demodulator at each receiving means receiving the respective second digitally modulated carrier and the demodulating signal and demodulating the second digitally modulated carrier with the demodulating signal to generate a resulting digital information signal.

Further in accordance with the invention there is provided a signal communication system comprising a base transmitter including transmitting means and also including receiving means, and comprising a plurality of module receivers, each of which includes a respective receiving means and also a respective transmitting means;

the transmitting means of the base transmitter including means for generating a first carrier of a first reference frequency N and for transmitting that first carrier respectively to the receiving means of the module receivers, wherein the said first carrier is generated at the base transmission means and transmitted therefrom in the form of sequential discrete envelopes;

each transmitting means of the base transmitter and the module receiver also including means for generating when transmitting a second carrier of second frequency N/n derived from the first reference carrier, where the divisor n is greater than 1, for generating a data word to be transmitted thereby, means for modulating the second carrier with the said data word, and means for transmitting the resultant modulated second carrier therefrom;

dividing means at each receiving means receiving the first carrier from the respective transmitting means and dividing it by the divisor n to produce a corresponding demodulating signal of frequency N/n; and a demodulator at each receiving means receiving the respective second digitally modulated carrier and the demodulating signal and demodulating the second digitally modulated carrier with the demodulating signal to generate a resulting data word;

the receiving means at each module receiver detecting each received data word and the module receiver in response to its termination generating a timing period of length such that the sum of the length of the received data word, the length of the timing period and the length of a module data word to be transmitted by the module transmitting means equal to the length of a respective envelope of said first carrier frequency;

the transmitting means at the module receiver modulating the respective second carrier with its data word to be transmitted and transmitting the resultant, modulated second carrier at the termination of the said timing period.

Thus, a wireless display module for an "electronic shelf" has four major requirements:
1. Two Way Communication;
2. Long Battery Life (3–5 years +);
3. Minimal Error Rates; and
4. Low Cost.

To simultaneously achieve all four requires several compromises. First to achieve low error rates and two way communication a phase modulation system is used. This previously has required a very complex circuit both to encode and decode the analog signal consisting of a phase locked loop or square law device, several amplifiers and encoding and decoding circuitry. A second major area of concern is that while with some difficulty it is possible to create a one way link of base station to module, the return signal from module to base station represents a major challenge. Power consumption in any CMOS device is due largely to capacitive discharge; thus, as the driving frequency for reception increases so does the power consumption. However, as the transmission frequency decreases, the efficiency for fixed transmission becomes very poor.

These problems are reduced with this invention by a unique phase encoding system employing a special reference carrier. This reference carrier is, in a preferred embodiment, nominally 132 kHz and initially is activated to frame the transmission from the base station in an envelope of predetermined length. The module takes the 132 kHz carrier and divides it by 2 using a conventional flip-flop to create a 66 kHz internal reference. The base station can then transmit digital data by phase shifting a second 66 kHz carrier also derived from the reference. The module makes a direct comparison with the 132 kHz divided by 2 signal to obtain a modulated digital output. When the module transmits back it again uses the 132 kHz signal as a reference and creates a 66 kHz carrier. This 66 kHz carrier is phase modulated to encode the digital data. The module transmitted signal is transmitted within the reference envelope a predetermined period after the data is received from the base station. The base station has the advantage that it therefore knows with a great deal of precision the frequency and timing of the return signal. This makes it possible to extract acceptable digital data with low signal-to-noise ratios with a high degree of reliability.

Description of the Drawings

Particular preferred embodiments of the invention will now be described, by way of example, with reference to the accompanying diagrammatic drawings, wherein:

FIGS. 5a through 5e illustrate the broadcast signals received by the modules and the digital signals produced therefrom for operation of the module;

FIG. 6 is a schematic illustration of the format of the operating binary word that is transmitted to the module;

FIGS. 7a through 7e illustrate transmission of base station data to a module and vice versa within a reference signal framing envelope;

FIG. 8 illustrates apparatus for investigating the best phase relationship for transmitting and receiving for each module;

DESCRIPTION OF THE PREFERRED EMBODIMENTS

The invention will be specifically described in its application to a self-service retail food store, particularly one of the supermarket type, in which typically there may be from about 5,000 to about 10,000 different items to be sold, each requiring its price to be clearly and positively identified, and each requiring that price notice to be readily changeable, often at very short notice, to take account of seasonal changes, etc. in wholesale prices, and to implement the marketing strategy of the store. It will be evident, however, that the invention is also applicable to other types of stores, such as clothing and general department stores, and to completely different types of installation, such as industrial plants, warehouses and distribution centres, exhibition and convention centres, and the tool and supply cribs of manufacturing establishments.

Figure 1:
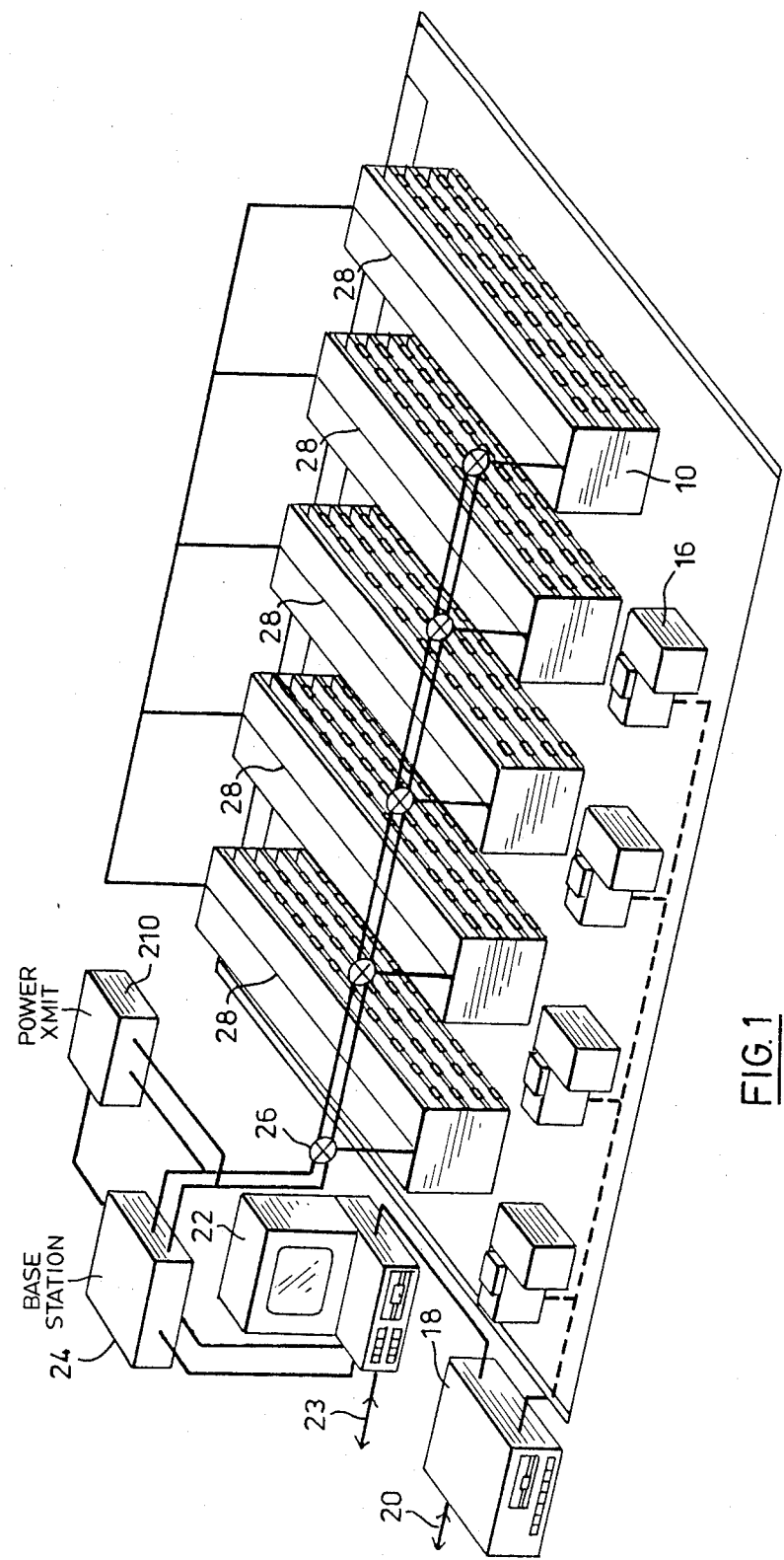
FIG. 1 is a perspective view illustrating a typical layout of part of a store in which the apparatus of the invention is employed.

FIG. 1 illustrates part of a typical retail store consisting of a plurality of spaced parallel multiple shelf units 10, each having a plurality of shelves 12, on the upwardly inclined front edge of each of which is mounted a plurality of longitudinally spaced shelf unit modules 14, one for each item whose price is to be displayed. The store also includes a plurality of check-out stations 16, each of which includes a point-of-sale terminal having a scanner able to read the bar code that is now almost universally an integral part of the item labels, and to display and record the corresponding price in the cash register. The stations 16 typically are controlled from an in-store main computer 18 to which information may be supplied as required via a telephone link 20 from a central office, or by direct keyboard, EPROM, tape, or floppy disc input, as will be apparent to those skilled in the art. This information is also supplied as required from the main computer 18 to a system computer 22 (which may also have its own similar input 23), which in turn is connected to a base station transmitter/receiver 24. The computers and the base station between them store the information required by the store in connection with the items sold, such as:

(a) the identifying bar code;
(b) the item price that day;
(c) information as to previous price history;
(d) details of a temporary sale price to be offered that day at predetermined times;
(e) the corresponding unit prices;
(f) the aisle, shelf and shelf position location;
(g) the number of facings on the shelf;
(h) the size of a standard unit for re-ordering;
(i) the list of words that each module can reproduce upon command; and
(j) the program that will result in announcements to be displayed on the module, such as "ON SALE", "15% OFF", etc., and the times at which it is to be displayed.

In this embodiment the base station 24 is a phase modulated radio frequency transmitter, the output of which is fed via switches 26 controlled from the station 24 via a separate control line 27 to the parallel segments 28 of the in-store broadcast antenna, which is disposed so that the parallel loop planes of the segments are horizontal. Each immediately adjacent pair of switches controls the antenna segment between them. Each of these segments has the two horizontal power carrying leads of the respective horizontal loop lying along the respective top surfaces of the two associated row of metal shelf units 10 so that each is electromagnetically coupled to its respective unit. With such an arrangement and at the frequencies employed the transmission is principally near field inductive and the practical range of each antenna segment does not extend much more than its own dimension beyond the shelf unit. The switches 26 permit the selection of the antenna segment or segments that are required to be energized at any time, so as to avoid energization of modules 14 that are not to be addressed, avoiding unnecessary operation thereof and power consumption, as will become evident from the description below. In this embodiment the connections to the antenna segments are taken through the utilities space above the store suspended ceiling requiring downwardly extending portions 30, but they could also be led through the floor and up the ends of the shelf units.

Figure 2:
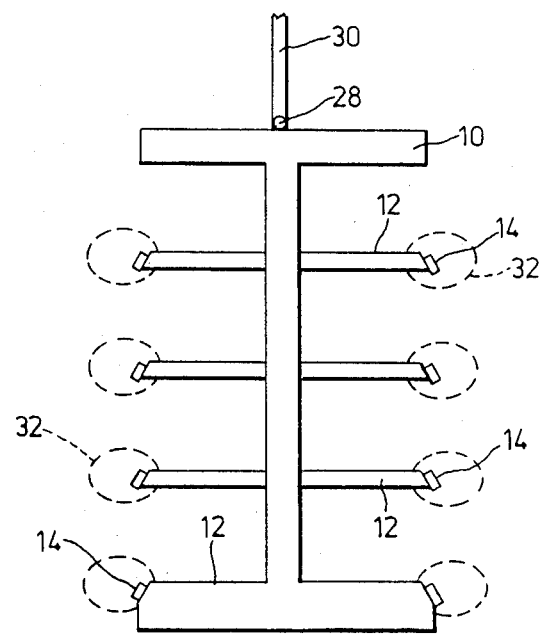
FIG. 2 is a transverse cross section through a shelf unit of FIG. 1 to illustrate the enhanced broadcast field that is obtained.

The shelf units 10 of such a store are almost universally of thin sheet steel because of load bearing requirements and it is found unexpectedly that, at the frequencies at which it is preferred to operate the system, which will be described in more detail below, placing part of the antenna segment 28 in sufficiently close contact with the metal structure so as to be electromagnetically coupled thereto results in greatly increased local radiation fields at the outer longitudinal edges of the shelves on which the modules 14 are located, as is indicated by the broken-line outlines 32 in FIG. 2. Thus, in a test installation voltages measured at the module locations were expected to be in the range of 0.5-3 volts, but instead were found to be in the range 1-9 volts, and moreover the voltages at the lower shelves further from the antenna were higher than at the higher shelves.

Figure 3:
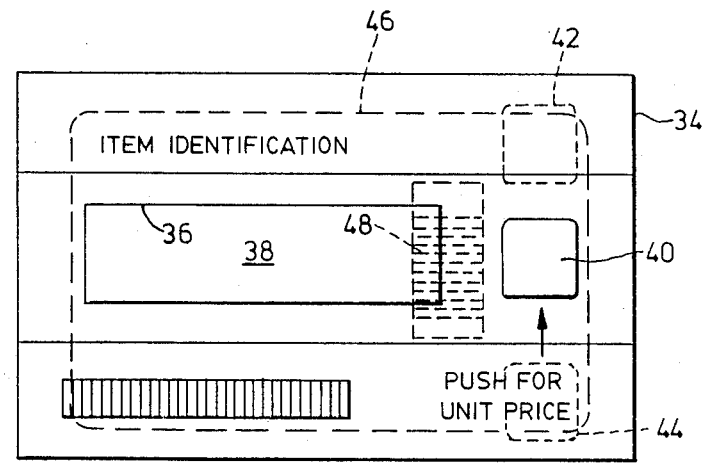
FIG. 3 is a front elevation of a shelf module of the invention, some of the internally mounted components thereof being shown in broken lines.

Referring now to FIG. 3, a shelf mounting module of the invention comprises a plastic molded case 34 that is generally rectangular as seen in plan and elevation, the front face of which has a rectangular aperture 36 behind which is mounted an LCD display 38 that is capable of displaying the required information upon suitable energization of the component segments thereof. A label is applied to the front face, the upper part of which contains item identification, while the lower part carries the corresponding bar code and instructions for operation of a visible unit price pushbutton 40. The manner of operation of the unit price button 40 is more specifically described in our U.S. Pat. No. 4,603,495, our application Ser. No. 732,114, the disclosure of which is incorporated herein by this reference.

Figure 4:
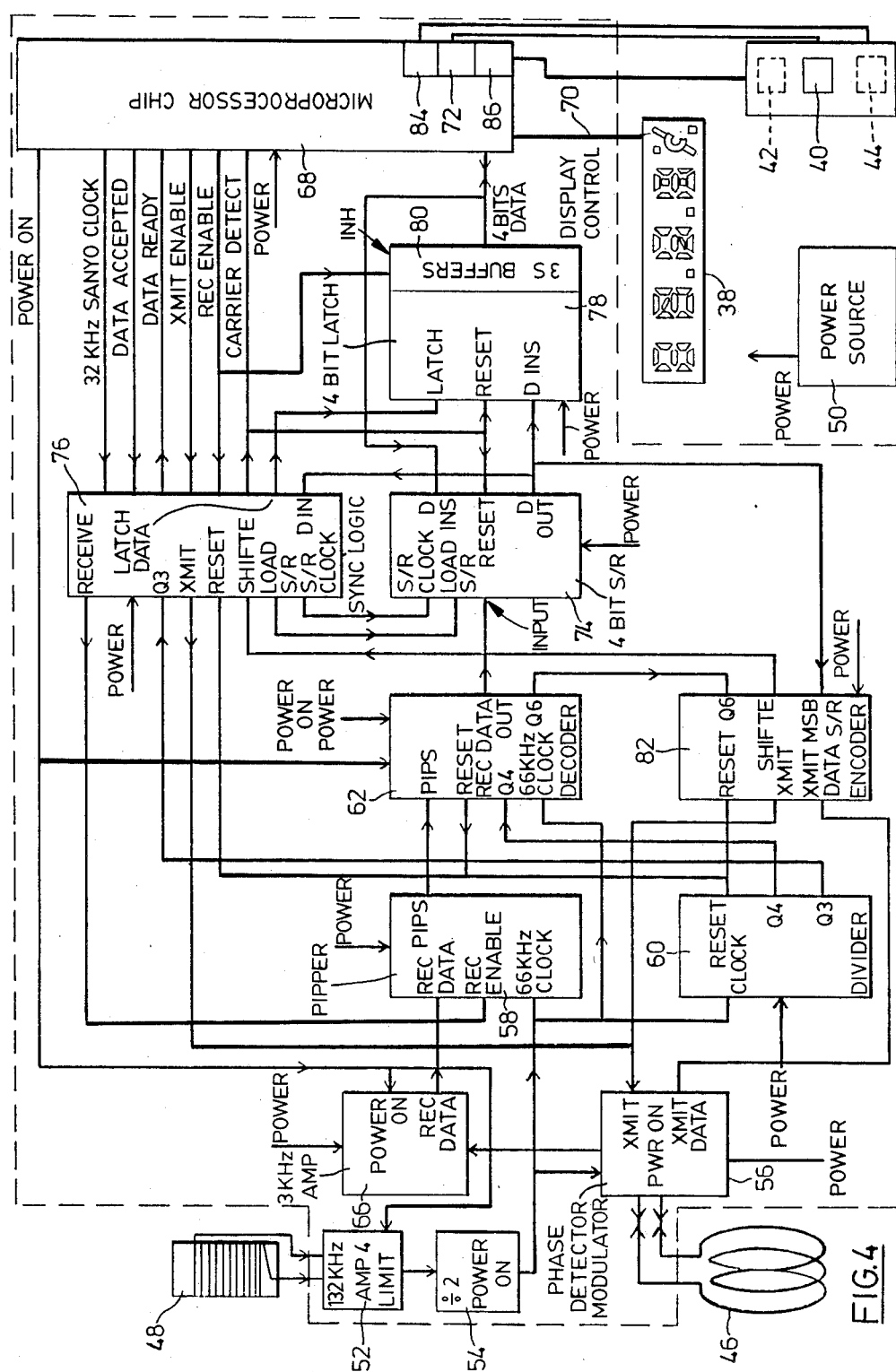
FIG. 4 is a schematic diagram of the operating circuit of one of the modules.

The module also has mounted therein behind the label two "concealed" pushbuttons 42 and 44 disposed respectively above and below the visible button 40, which during normal shopping hours are usually disabled to prevent their accidental operation by, for example, a child touching the module. The functions and operation of these two concealed buttons when they are enabled will be described below. The case 34 also mounts a low impedance, low Q, air-cored receiving/transmitting loop antenna coil 46 disposed with the plane of the loop parallel to the casing front face and with its longer sides parallel. The case further mounts a higher Q, higher impedance ferrite-cored receiving loop antenna coil 48 disposed with its loop plane at a right angle to the casing front face and thus at a right angle to that of the coil 46; in this embodiment its longer loop side is also parallel to the case longer edge. The loop 48 is positioned as centrally as possible and, with the relative orthogonal placement, minimizes the coupling between them. It will be noted from FIG. 2 that the modules are mounted on the shelf edges inclined at an angle to the vertical, so that the loop planes of the two antennae 46 and 48 are not orthogonal to that of the loop antennae segments 28, but are inclined at that angle, which is necessary for other than minimal coupling between them. The above mentioned electromagnetic coupling is also found unexpectedly to effectively increase this angle, as though the field is being bent, so that the transmission efficiency from both of the coils to the store antennae is increased with minimum coupling between the coils themselves. Each module also contains a circuit board which is not illustrated in FIG. 3 but is shown schematically in FIG. 4.

The power for each module is provided by a power source 50, which in this embodiment is a lithium battery of 0.2 amp hour capacity having a potential life for operation with the circuit of the invention of about 3–5 years. In view of the fact that a typical retail store will contain at least 5,000 modules this is the extent of the life that is preferred by the industry, since battery replacement of so many modules is a time-consuming and costly operation. The manner in which the circuit of the invention is able to obtain such an extended shelf life with such a battery will be described below.

The base station transmitter transmits a first reference carrier signal of frequency N, which in this embodiment is 132 kHz, the frequency being determined by division down from a crystal controlled oscillator to, obtain the desired stability. Provided the module is powered to receive a signal, as will be described below, this is received by the smaller ferrite-cored antenna 48, amplified by amplifier 52 and divided by an integer n, which in this embodiment is 2, by divider 54 to produce a demodulating or heterodyning signal of 66 kHz frequency (N/n) that is fed to a circuit 56, to be described in more detail below, which is operative alternatively as a bi-phase detector or a modulator. The divider output is also used as a clock signal and for that purpose is fed to a pipper 58, a divider 60 and a decoder 62. The transmitter also transmits an information containing signal, to be described in more detail below, consisting of a second carrier at 66 kHz, also derived from the same crystal standard, phase modulated by a coded digital signal, this second modulated carrier being received in the module by the larger air-cored antenna 46 and fed to the circuit 56 configured as a phase detector. The output of the bi-phase detector is an information-containing encoded, digital pulse signal with pulses that are positive-going or negative-going with respect to ground resulting from demodulation of the second modulated carrier signal from antenna 46 employing as a demodulating reference the divided signal from divider 54. This digital output signal is fed to a narrow band filter and amplifier circuit 66, in which it is shaped as required and unwanted frequency components (such as the 132 kHz harmonic) are removed. In this embodiment a pass band filter of 3 kHz is employed.

A high Q, ferrite-core coil 48 is preferred for the reference frequency antenna since it is relatively immune from the effects of ambient noise, which is relatively high in the particular environment of a food store with extensive lighting, refrigeration and air conditioning installations, particularly to the effects of "spikes" which might otherwise cause unwanted frequency and phase changes. On the other hand, a low Q air cored coil is preferred for the receive/transmit antenna 46, particularly when it is required to transmit, since more power can be radiated as compared to a ferrite-cored antenna, and the receiver bandwidth can be greater to permit higher BAUD rates to be used.

FIGS. 5a–5e show the sequence of signals beginning with that received by the antennae and subsequently that obtained from the phase detector 56. Thus, FIG. 5a shows a typical 132 kHz first carrier signal received by antenna 48, and FIG. 5b shows the resultant divided demodulating reference signal from divider 54. FIG. 5c shows a typical phase modulated signal obtained from antenna 46 having two phase transitions at X and Y. The signal at 5d is the output of the phase detector resulting from detection using the reference frequency signal 5b, and that at 5e is the resultant signal after smoothing and filtering, consisting of either positive- or negative-going pulses about the zero volt line 0V. Since all of the subsequent circuits are of binary digital type, the high pulse value is "1", while the low pulse value is "0".

The amount of information required to be transmitted to the module is relatively limited and it is found adequate to operate with a 32-bit binary operating word, as illustrated by FIG. 6, subdivided into eight 4-bit "nibbles" N4–N11. The word is preceded by three password nibbles N1–N3 and ends with two sync nibbles N12 and N13, whose function will be described below. The first data nibble N4 of the word is a module instruction start, while the second nibble N5 is an instruction modification to the instruction start, the two instructions combining to instruct the module as to the action that is to be taken with the data nibbles N6–N9. The last two nibbles N10 and N11 are both complement check sum coded for the data nibbles, this relatively large check sum coding being employed to ensure accuracy for the data under the difficult conditions in which the modules operate. The complement is employed to ensure that a positive response is always obtained, so that a "1" is always detected avoiding the ambiguity caused if no response were obtained, which might be due to module failure. Another level of security is provided by encoding the digital signals at the transmitter and decoding in the module, and vice-versa when the module is transmitting, using, for example, bi-phase mark or space coding. Since the system is not in any way time-critical, a conservative coding system can be employed despite the fact that it results in half speed transmission. Such coding of digital data is described, for example, in Pages 384–395; 535–536 of "Introduction to Communication Systems" by F. G. Stremier, published 1982 by Addison Wesley, Redding Mass, which is incorporated herein by this reference. At the base station the coding and encoding will be included in the software of the controlling microprocessor. The coding system employed in this embodiment is such that upon encoding both "0" and "1" will produce pulses with transitions at the ends of the respective bit periods, while a "1" will additionally result in a transition at the middle of a bit period; and vice-versa upon decoding. A conservative coding of this type has the advantages that it gives a zero average voltage, which is more certain than one which gives an average positive or negative voltage that can vary and perhaps cause loss of data, and that it constitutes a built in clock making it easier to synchronize the coded and uncoded bits of the original data. It is found in practice important that the coding system used is polarity insensitive, so that initiating conditions of the circuits employed will not affect the validity of the data.

Referring again to FIG. 4, the overall control of the system is maintained by a microprocessor chip 68, which can be a standard chip as employed in a digital watch or clock, such a chip already including, besides its microprocessor and internal clock, the registers for the control of the LCD display 38 which corresponds to the usual LCD watch or clock display; the control being exercised through connection 70 with the requisite data stored in the many storage registers provided in the chip. For example, the data for item price, which usually must be displayed continuously, will be stored in the register that is normally continuously accessed, while the corresponding data for unit price display is stored in another of the registers which is accessed to replace the item price information on the display upon the shopper pressing the visible button 40, the button assembly being connected to the clock chip through a respective register 72. The chip also may contain program registers, as many as three, which can be programmed to cause the chip to cycle through the display registers in a preset sequence, so that individual words in those registers can be made to display in sequence, thus providing a special announcement upon addressing the particular program register, each program giving rise to a respective message selected from the words available in the registers. Such a chip may, for example, have as many as fourteen display registers, the smallest of which are of 16-bits capacity with the lead 4 bits available for display instructions, while the remaining 12 bits are available for display data; the chip may also contain as many as four maintenance registers of smaller capacity, e.g. 8 or 4-bits, which can be used for other functions such as are described below.

Another important function performed by the microprocessor chip 68 is to provide a much reduced duty cycle for the radio frequency parts of the module, such as the amplifiers 52 and 66, which are of relatively high power consumption. The chip will include a programmable on and off register and in the chip employed this is of 16-bit capacity with the first 4 bits used to set the length of turn on time and the remaining 12 used to set the length of turn off time. Thus, typically the chip continuously turns on the RF circuits for a period of 0.5 seconds and, if no first reference carrier signal is received during that period, it turns them off again for a much longer period, typically 10 seconds, to give a duty cycle of 20. As long as the first carrier signal is detected, as described below, the chip remains turned on until the reference ceases for the "RF ON" time which in this embodiment is 0.5 second duration. Such a cycle will usually increase the battery life by a factor of about 2 times, since each module is operative for only a very small fraction of the total time, but of course the microprocessor chip itself and other parts of the circuit must remain powered at all times.

The base station will usually remain powered, but quiescent, until it is instructed to transmit to one or more of the modules, whereupon the first reference carrier is transmitted for at least 10½ seconds, to ensure that transmission occurs during the "on" portion of all the module duty cycles; at the end of this transmission all of the modules will therefore be "on". The first carrier is then switched off for a period of about 50 milliseconds, which is too short for the modules to switch off, and both the first reference and the second modulated carriers are now transmitted simultaneously. This permits the first carrier to be used to "frame" the transmitted data and the data received from the module, as will be described below.

Referring again to FIG. 4, with the RF portions of the module powered by the clock chip signal from "RF POWER ON" and the reference carrier and the modulated carrier received during that period, the output of the amplifier 66 is fed to pipper 58 from "REC DATA" terminal to "REC DATA" terminal, the clock signal from the divider 54 being fed to "66 kHz CLOCK". The pipper produces an output pulse or pip each time there is a state change in the received data and these are fed from its "PIPS" terminal to the "PIPS" terminal of the decoder 62 which decodes the bi-phase coded data back to normal binary code data. Thus, the decoder, which also receives the 66 kHz clock signal, determines whether a pip occurs in the middle of a time period and, if so, generates a "1" and, if not, generates a "0". The decoded binary signal is fed from terminal "DEC DATA OUT" to terminal "INPUT" of a 4-bit shift register 74 in which the signal shifts while the data in the register is fed from terminal "D OUT" to terminal "D IN" of sync logic circuit 76. When synchronism is detected by sync logic circuit 76 between the first password nibbles N1–N3, and after a one nibble delay, a "LATCH DATA" signal is sent from that terminal of circuit 76 to the "LATCH" terminal of a 4-bit latch 78, and the subsequent data nibbles N4–N11 are subsequently latched into the latch from terminal "D OUT" to terminal "D IN", and fed through tristate buffers 80 to the "4-BITS DATA" terminal of the microprocessor chip for utilization therein. Tristate buffers are required since the data moves in both directions to and from the microprocessor. The password N1–N3 will be the same for all modules and is employed to ensure that the module does not attempt to respond to spurious data; three nibbles are employed for added security; typically, the word will be a unique three digit number, the first of which will usually be zero. The first transmission or transmissions supplied to the chip 68 have in the instruction and data nibbles N4–N11 an identifying instruction or instructions for the module to be addressed; upon the chip 68 detecting that it is being addressed, it is enabled to receive further data and write it into its registers, while if it does not detect an identifier, it remains quiescent and ignores the further data received from the buffers.

As will become evident, it is essential for correct operation that the reference carrier is present; it is detected by divider 60 which transmits a one-sixteenth divided clock signal (4125 Hz) from terminal $Q_3$ to the corresponding terminal $Q_3$ of the sync logic 76; effectively the sync logic circuit counts the number of cycles received in a time period set by this clock signal and, if sufficient are counted for this to be the required carrier, it sends a "carrier detect" signal to the respective microprocessor chip terminal, whereupon the clock chip returns a "receive enable" signal to the sync logic. The carrier detect signal is also used as the reset signal for the shift register 74 and the latch 78. The sync logic also, upon detection of the required password N1–N3 flags the chip 68 through the "DATA READY" connection every four bits synchronous with latching the data into the latch, so that it is ready to receive the data to be used. Upon conclusion of the receipt of each four bits, the "data ready" signal is cleared by the microprocessor chip by pulsing the "DATA ACCEPTED" connection.

Upon the reference carrier ceasing, the carrier detect signal to chip 68 also ceases and a time out time period starts to operate that will usually be of the same length as the turn on time and produced by the same register, the RF circuits being switched off after this time until a new time out period of 10 seconds elapses. This means that instructions to the module must be transmitted at a rate faster than this off time period.

A system as already described with individual battery operated modules, each of which can be individually addressed by a broadcast transmitter, so that no hard wiring is required, is already of great value in the type of installation to which it is directed. Some way usually is needed to confirm that data has been safely received, and systems for this will be described below. However, the value of the system is even greater by providing that the modules can transmit appropriate information back to the base station and the store computer. For example, it is then possible for re-stocking personnel to walk along the aisle and immediately upon visual inspection of an item transmit back the identity of the item, its current shelf location and the quantity required for re-stocking. All of this is to be accomplished, if possible, without decreasing the battery life more than is absolutely necessary, in order to achieve the desired target of 3–5 years life or longer. The manner in which this is accomplished in this embodiment will be described after further description of the protocol employed to transmit data to the module.

As has been indicated above, the operation of a radio frequency broadcast system of the invention involves two different difficult problems, namely the extremely noisy environment in which the inherently low power system must operate, and the need for extreme battery life which implies extremely low power consumption. The power of the base station can of course be made as high as is necessary with relatively low additional cost. A phase modulated system is selected because of its inherent high noise tolerance, and digital coding of the transmitted data is employed again because of the low power digital circuit elements than can be employed to manipulate such data. Encoding of the transmitted digital signals in both directions provides yet another level of security for the subsequent accurate detection of the data. The conventional procedure in demodulating phase modulated signals is to employ a phase locked loop in the detector, but in the very noisy environments encountered there is the danger that the loop would lock onto adjacent interference instead of the signal, or take so long to lock onto the signal among the ambient noise that data transmission becomes impossibly slow, even though speedy transmission is not usually required. A phase locked loop therefore would need to be kept in constant operation and could not duty cycle as described above, and would in addition require an accurately controlled oscillator and thus involves a considerable power consumption in each module. For example, a circuit employing such a loop that was prepared required an operating current of about 50 microamps, which is to be compared with the average consumption of about 5 microamps achieved with the module described, in which the chip 68 required an operating current in the range 3–5 microamps. The need for such a loop is avoided by the apparatus of the invention employing a reference frequency generated by the base station and divided in the module to provide the demodulating reference for the lower frequency data-carrying signal.

Another aspect of the invention leading to lower power consumption is the choice of an operating frequency in the range 10–500 kHz. The power consumption of digital devices, such as the CMOS type that usually are employed because of their low cost and power consumption, is directly proportional to the number of switching transitions required for operation, and the low speeds selected are completely adequate for the relatively low speed data transmission that is required. Broadcast signals in this range of frequencies inherently are of short range, so that with the employment of a segmented antenna power consumption is reduced, since only a specific group of modules can be addressed, and the unwanted modules do not receive data only to ignore it when it is not addressed to them. The low frequency also facilitates the electromagnetic coupling to the metal shelf units as described above, which also limits the effective range of each antenna segment. With much higher frequencies, there is the greater possibility of phase shift with the different distances of the modules from the store antenna, although this can be compensated with the system of the invention, as described below. The initial instruction from the base station will be preceded by control signals to the required switches 27 to turn on the respective antenna segments, the switches all being reset to open upon conclusion of the transmission. There will, however, be applications of the invention in which such lengthy battery life and restricted range are not required, and in such cases the frequency employed can be very much higher, for example up to 50 MHz.

Referring now to FIGS. 7a through 7e, a further aspect of the invention to combat the noisy environment is that the data is transmitted from the base station in the form of discrete words that are framed by a reference envelope of the reference frequency transmission. Moreover, if the module is instructed to transmit back to the base station, then each data word transmitted by the module is also framed by the reference envelope containing that instruction; in addition; the module data word is located precisely within the reference envelope, so that the base station will have correspondingly precise information as to the start time when the module transmits the word and can therefore more easily detect its leading edge, even in considerable noise, and accurately read the corresponding data. FIG. 7a illustrates the reference envelope of the 132 kHz reference signal that is generated by the base station transmitter in response to instructions from the controlling microprocessor, the duration or length of the envelope being fixed as described below. Receipt of the envelope by the module generates the carrier detect signal (FIG. 7b) from the sync logic 76 with a slight propagation delay (of the order of 2 milliseconds in this embodiment) between the respective leading and trailing edges through the system, and this is followed by the receive enable signal from chip 76, again with a small system delay. The chip now receives the base station transmitted word (FIG. 7c) and it will be seen that, owing to the system delays, part of the first nibble N1 may not be received; it is for this reason that a very generous three nibble password instruction is employed, and the first nibble will usually be zero, so that its loss is immaterial. The receive enable signal ceases at or close to the end of the word and may occur during the word at sometime during N12; the receive signal is synchronized by the sync logic to terminate at the end of N12. A very generous two nibble complement check sum N10-N11 is provided for increased security.

The base transmitted instruction N4-N11 may be such that no specific response is required from the module; for example, it may simply provide a new item price and unit price to be inserted in the respective register. It will usually be preferred that some response is provided, even if only an acknowledgement from the microprocessor chip that data has been received and entered, and the system of the invention permits ready confirmation that the data from the control computer has been received. If such an acknowledgement is not received by the base station, then it can be programmed to repeat the word for a specific number of times, perhaps with the same number repeated after one or more intervals; if after a specified number of such attempts still no acknowledgement is received, then the computer will be advised of the nil response and will flag that the unresponsive module requires examination by service personnel. The reference frames are also transmitted spaced a precisely fixed period apart, the period between being sufficient to ensure that the somewhat slow acting module can take the necessary action; in this embodiment the preferred period is 100 milliseconds. A typical instruction requiring a response that is more than an acknowledgement is to read out the contents of a maintenance register that have been addressed by a re-stocking clerk with information as to the re-stocking quantity required. The receive enable signal goes low as described above and sync logic 76 synchronizes the receive enable signal to the trailing edge of the nibble N12 and computes a precise period $T_1$ for transmission to begin of the module transmit word n1-n6. This is done by the divider 60, decoder 62, encoder 82 and counters in the sync logic 76 continuing to run, with the sync logic counting four bit periods at the lower transmission BAUD rate until the transmit enable line goes high, whereupon at the leading edge of the next four bit period transmission begins. The phase detector/modulator 56, operative as a modulator transmits encoded zeros resulting from data left in the shift registers, which must be zeros since the pipper is not operative, until it receives valid data for transmission which begins at the leading edge of the said next four bit period. The transmit enable signal (FIG. 7e) embraces the period required for the module transmit word to be transmitted from the module. As described above, the base station transmitter has of course the information as to the duration of nibbles N1-N11 of the transmitted instruction and by adding the known period $T_1$ has information as to the precise time of receipt of the leading edge of module transmit nibble n1. The transmit enable signal is made as short as possible to conserve power.

The length of period $T_1$ is made such that the microprocessor chip is able to carry out any computation that is required before providing the corresponding transmit information. In this embodiment the module transmit word consists of 24 bits, consisting of a 16-bit, four nibble instruction n1-n4, and an 8-bit, two nibble complement check sum n5 and n6. Again, in view of the noisy environment and the low power available for module transmission, the BAUD rate for the module transmission is made much lower than for the much higher powered base station transmission so as to increase the effective signal-to-noise ratio, and in this embodiment, while the base station transmit rate is 1375 BAUD, the module transmit rate is 258 BAUD.

The transmit enable signal is sent from "XMIT" terminal of the sync logic to the corresponding terminals of the encoder 82 and the phase detector and modulator 56, the latter being switched by the signal to function as a modulator of the 66 kHz signal it has been receiving from divider 54. The data to be transmitted goes from the "4-BITS DATA" terminal of chip 68 directly to the shift register 74 at "D INS" where it is counted by the sync logic 76; each time a 4-bit nibble is counted, the logic 76 advises chip 68 via connection "DATA READY" so as to receive the next nibble and instructs the shift register via "LOAD S/R" (send/receive) and "S/R CLOCK" to transmit the nibble one bit at a time (the most significant bit) to the encoder, which encodes into bi-phase code. The coded signal goes from "XMIT DATA" terminal to the corresponding terminal of the circuit 56 which modulates it on to a 66 kHz carrier and sends the resultant phase modulated signal to the antenna 46 for broadcast transmission to the base station.

Each of the two "concealed" buttons 42 and 44 is connected to a respective register 84 and 86 of the chip 68 and can be employed for different functions as those registers are instructed by the store computer. For example, as described above, one of the chip maintenance registers can be employed to record the re-stocking required for the item to which it relates. When this is required, the two buttons can be designated by their registers respectively to increase and decrease the value recorded in this register, so that the required value is available when subsequently the chip is instructed by the store computer to advise it of the stored value. When assigned the respective function the buttons can be used to increment or decrement the facings register, or can by means of an assigned code of button pushes instruct the computer, for example, that a particular item is "SOLD OUT" on the shelves.

One of the practical difficulties encountered with a system functioning as a unitary network is that there are many different individuals within a store that have to control different parts of the store at the same time. For example, in a typical supermarket store, there may be as many as 10–15 employees responsible for different aisles. Employee one may want to put his/her aisle in a mode such that the modules display the backroom inventory. A second employee may want to be reordering. Employee three may want to display the number of facings of the items to check that they are in accordance with a revised store plan (planogram), etc. One solution would be that all the employees could refer to a computer supervisor, or could be taught how to use the computer; but these are not very practical.

In accordance with the invention, to meet this requirement there are placed in the store at different locations for easy access by the personnel involved a number of modules that are not associated with a specific product, but instead can be used by the personnel to transmit information to the store computer as required. The most satisfactory location is on a shelf in the appropriate location; since it can be accessed by the public, it is desirable that a specific security code of button pushes of the visible button 40 be required before the module can access the computer, or before the concealed buttons are enabled. These independent modules can be polled by the computer at regular intervals, for example every 30 seconds, to determine if the security code has been entered, and if so what action or information the operator requires. For example, by inserting a predetermined code of button pushes with the visible and/or the concealed buttons, the computer may be instructed to place the specific aisle in the required mode (e.g. re-ordering, facings, available stock, etc.), so that the operator can now move along the aisle operating each of the fixed modules to transmit the corresponding information to the base station computer. The preferred mode of such an operation is for the operator to instruct the store computer to enable all of the associated modules to receive the required information by means of a button code inserted via any of the buttons, or any combination thereof. The operator then moves along the aisle, or shelf, operating each module, again by a predetermined button push protocol, to insert the required information. When this is completed the mode module can then be operated to instruct the computer that the modules are ready and available for the information to be retrieved.

Figure 9:
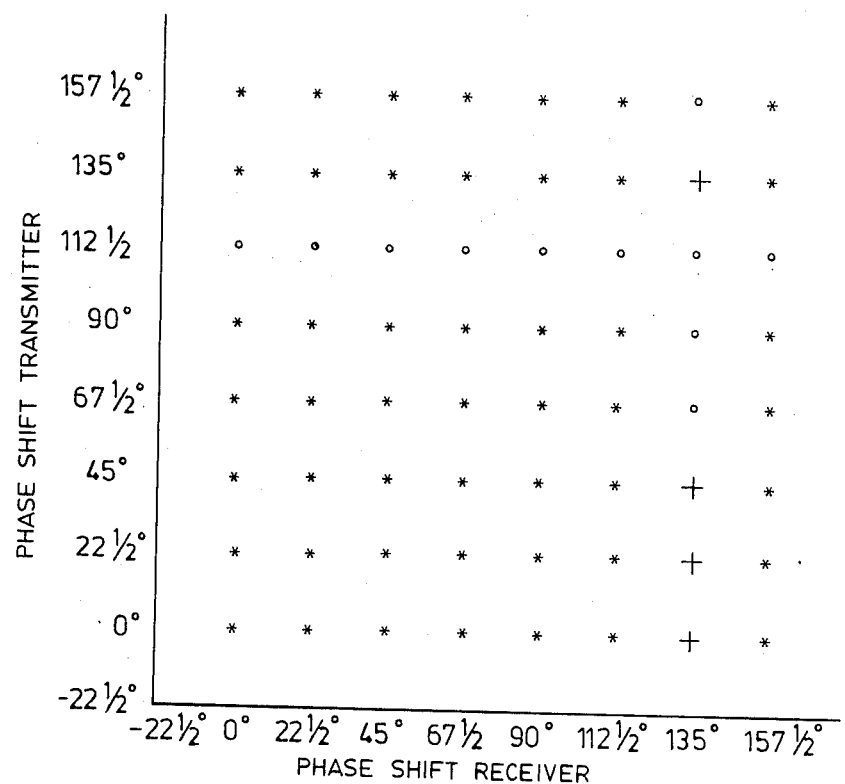
FIG. 9 is a plot of a typical table of the different transmit/receive phase relationships in the modulator and detector at the base station.

Another problem that is addressed and mitigated by the system results from the manufacturing constraints in producing apparatus that is sufficiently cost effective for industrial use, particularly a low margin industry such as food retailing. The antenna coils must be tuned as closely as possible to the operative frequency, particularly the high Q coil 48, but this can be expensive, requiring sophisticated winding machines and/or choice of low tolerance (and consequently expensive) components, or the use of tunable cores and components. The coil 48 can therefore have a resonant frequency which is as much as ±1 kHz from the required value. Again, the assembly of the circuit board, particularly the connection of the antennas, can result in changes in the phase response of the assembled module, which will differ from module to module. The location of the module relative to the store antenna, its position on the metal shelving, and whether or not the associated items are in metal or non-metal containers can also affect its response. This problem is mitigated by the system illustrated schematically by FIG. 8, wherein each module 14 is first mounted at its operative location, before operative data is transmitted to it and, then there is transmitted from base station 24 a standard signal of phase designated as of zero phase, which signal instructs the module to respond with a return signal; the voltage of the return signal received at the base station via its detector 24a is measured and recorded also at a phase designated as of zero phase. This transmission is repeated while the phase of the detector at the base station is cycled in discrete equal increments through 180° by phase changer 24b; it has been found in practice that it is quite adequate to change the phase in this manner through eight equal steps of $22\frac{1}{2}°$ each. The eight values that result are plotted as the bottom line of the table in FIG. 9. The phase of the transmitted signal is then changed by the same size step (i.e. $22\frac{1}{2}°$) via phase changer 24c operative with transmitter modulator 24d, the phase of the detector again cycled in eight steps through 180° and the results plotted. This procedure is repeated until the phase of the transmitted standard signal has also been cycled in eight steps through 180°. In practice this cycling and recording will be under the control of a program in the store computer. A typical plot of the 64 results thus obtained is shown in FIG. 9, wherein a star shows a good combination, a cross shows a combination in which some data error occurred and should therefore be avoided, and a dot shows an unusable combination. One of the usable combinations, preferably one among a number of adjacent high values, is then selected and programmed into the computer to be used with that module during any interaction with it. It will be seen therefore that considerable tolerance is available in the system as operated to compensate for quite wide tolerance in this electrical characteristic of the module circuit.

Figure 10:
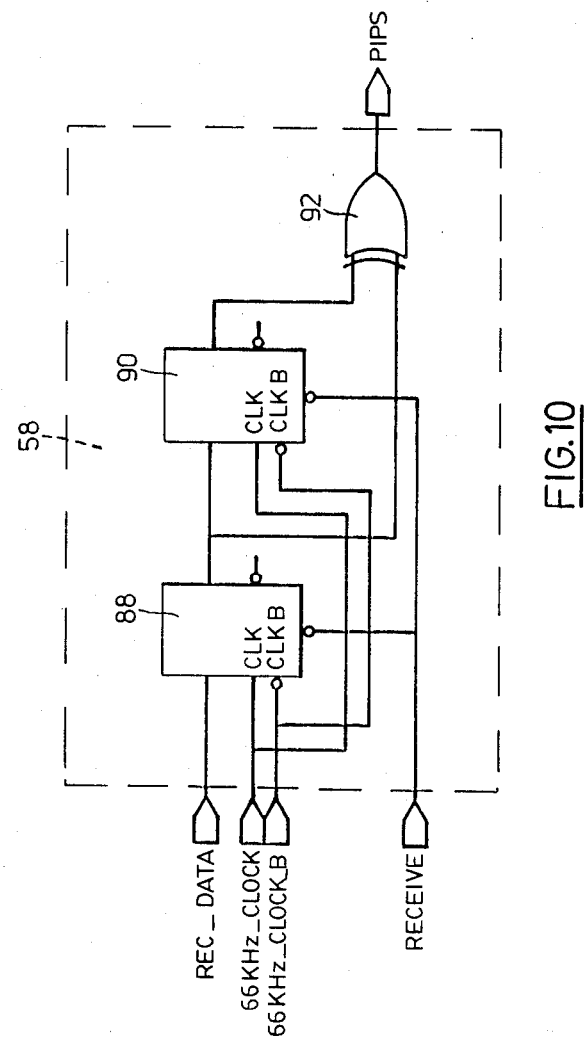
FIG. 10 is a more detailed schematic circuit diagram of the pipper circuit of FIG. 4.

Referring now to FIG. 10, the pipper circuit 58 in this embodiment is operatively a 2-bit shift register, consisting of two flip-flops 88 and 90, which are fed from its receive data terminal and 66 kHz clock terminal, the flip-flops requiring both clock and clock invert inputs for operation. The flip-flops are enabled as described above upon receipt of a signal on the receive enable terminal, their outputs being fed to an exclusive OR gate 92 which produces the output that is fed to the decoder. Thus, if the received data has a change of state from 1 to 0, or 0 to 1, then the transition is shifted in the shift register formed by the flip-flops, and there will then be a difference between the states of 88 and 90 as fed to the gate 92. If such a difference occurs, then an output pulse is generated by the gate and fed out at the "PIPS" terminal.

Figure 11:
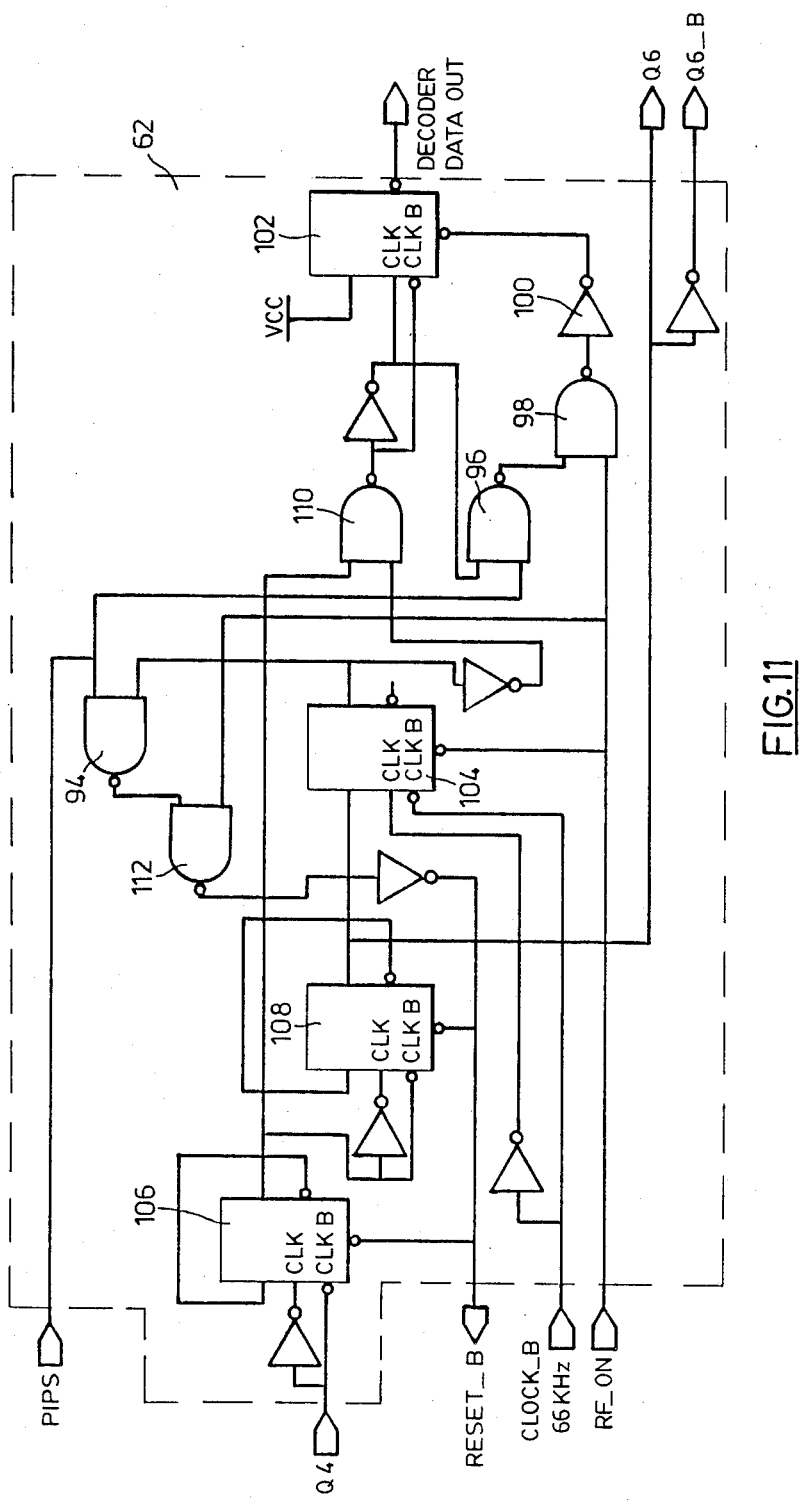
FIG. 11 is a more detailed schematic circuit diagram of the decoder circuit of FIG. 4.

Referring now to FIG. 11, in the decoder circuit 62 the pips received from the pipper circuit 58 on the "PIPS" terminal can be of two categories, namely reset pips which are those produced at the ends of each transition and the data pips, which are those produced between bit end transitions, as detected by their time of occurrence, to indicate that the data is a "1" or "high". These pips are fed to NAND gates 94 and 96, the latter resetting the decoder data out terminal via NAND gate 98, inverter 100 and flip-flop 102, provided gate 98 is enabled by an RF ON signal. The other input of gate 94 is fed from flip-flop 104 which is clocked by the 66 kHz signal from divider 54 received on the respective terminal. This flip-flop receives its input at terminal D from two series connected flip-flops 106 and 108 that are clocked by the Q4 signal from divider 60 at one-sixteenth the clock rate (i.e. 4125 Hz with pulse length 242 microseconds); these count the input pulses and the state of flip-flop 108 output determines whether the pip is a reset or data pip; the output of flip-flop 108 is fed through flip-flop 104, and it is the output of the latter that is fed to gate 94 and NAND gate 110, the purpose of this flip-flop being to ensure that the pulses are of specific length, in this embodiment 15 microseconds. The output of gate 94 feeds NAND gate 112, which also receives the RF ON signal, and which generates the reset pulses fed to the RESET terminal, and also the flip-flops 106 and 108. It will be seen that the circuit is continuously reset to 0, whenever "RF ON" is not on, which also ensures that noise cannot operate the circuit. The flip-flops 106 and 108 count the time from the previous reset pip and the two NAND gates 96 and 110 gate a pip, that from its timing is a data pip, to the data output flip-flop 102. The output Q6 of flip-flop 108 is employed in the encoder 82 and the decoder therefore runs freely whether or not it is being employed to decode. Inverters are required throughout this and the other circuits to provide the necessary signal direction, as is apparent to those skilled in the art, and need not be specifically identified. Also, the signal required for correct operation may be the signal itself, or its complement ($_{13}$ B), or both, as is apparent to those skilled in this art, and specific identification of this function is not required.

Figure 12:
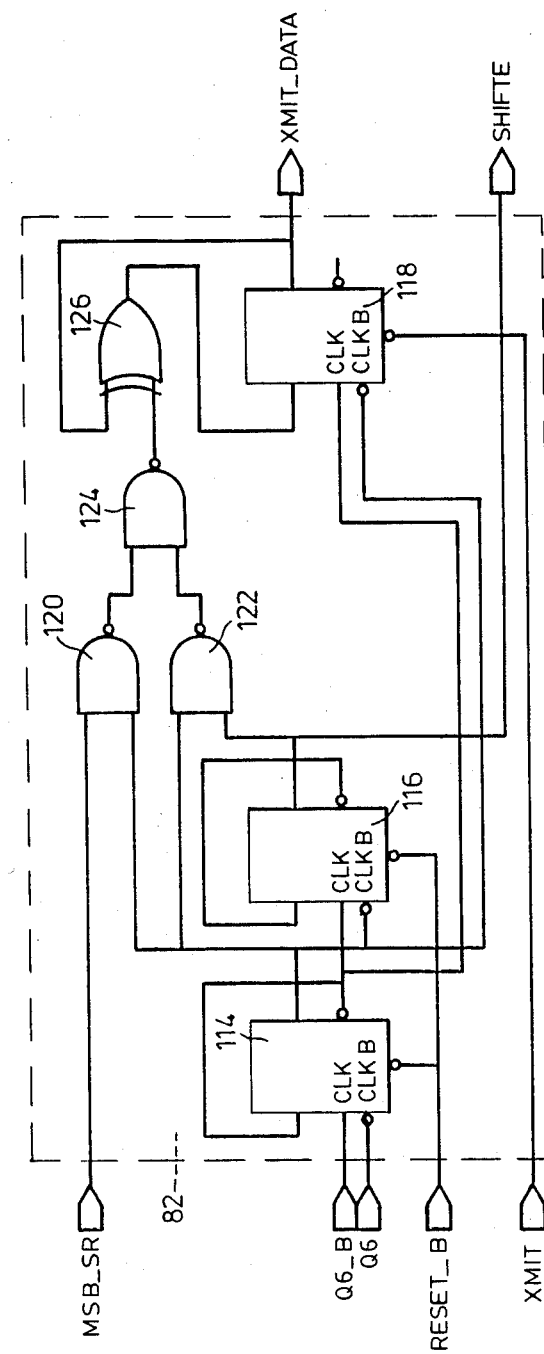
FIG. 12 is a more detailed schematic circuit diagram of the encoder circuit of FIG. 4.

Referring now to the encoder circuit of FIG. 12, the two flip-flops 114 and 116 again comprise a two stage counter that is fed from Q6 and Q6$_{13}$ B of the decoder, which is one quarter of the input frequency to the encoder (i.e. 1031 Hz) because of the lower BAUD rate at which the module transmit data is transmitted. Output flip-flop 118 is clocked from the output of flip-flop 114 twice per transmit bit period, and the output of flip-flop 116 fed through NAND gates 120, 122 and 124, and exclusive OR gate 126, ensures that flip-flop 108 will always toggle on the end of a bit period; it is toggled twice per bit period and, in the middle of the bit period when flip-flop 116 is not set, the state of the most significant bit incoming on terminal MSB_SR from shift register 74 determines whether or not there is an additional mid-period toggle. The output of flip-flop 116 also feeds from the encoder at terminal "SHIFT E" to the sync logic 76 and thence via "LOAD S/R" and "S/R CLOCK" to lock the shift register while each bit is clocked and encoded.

Figure 13:
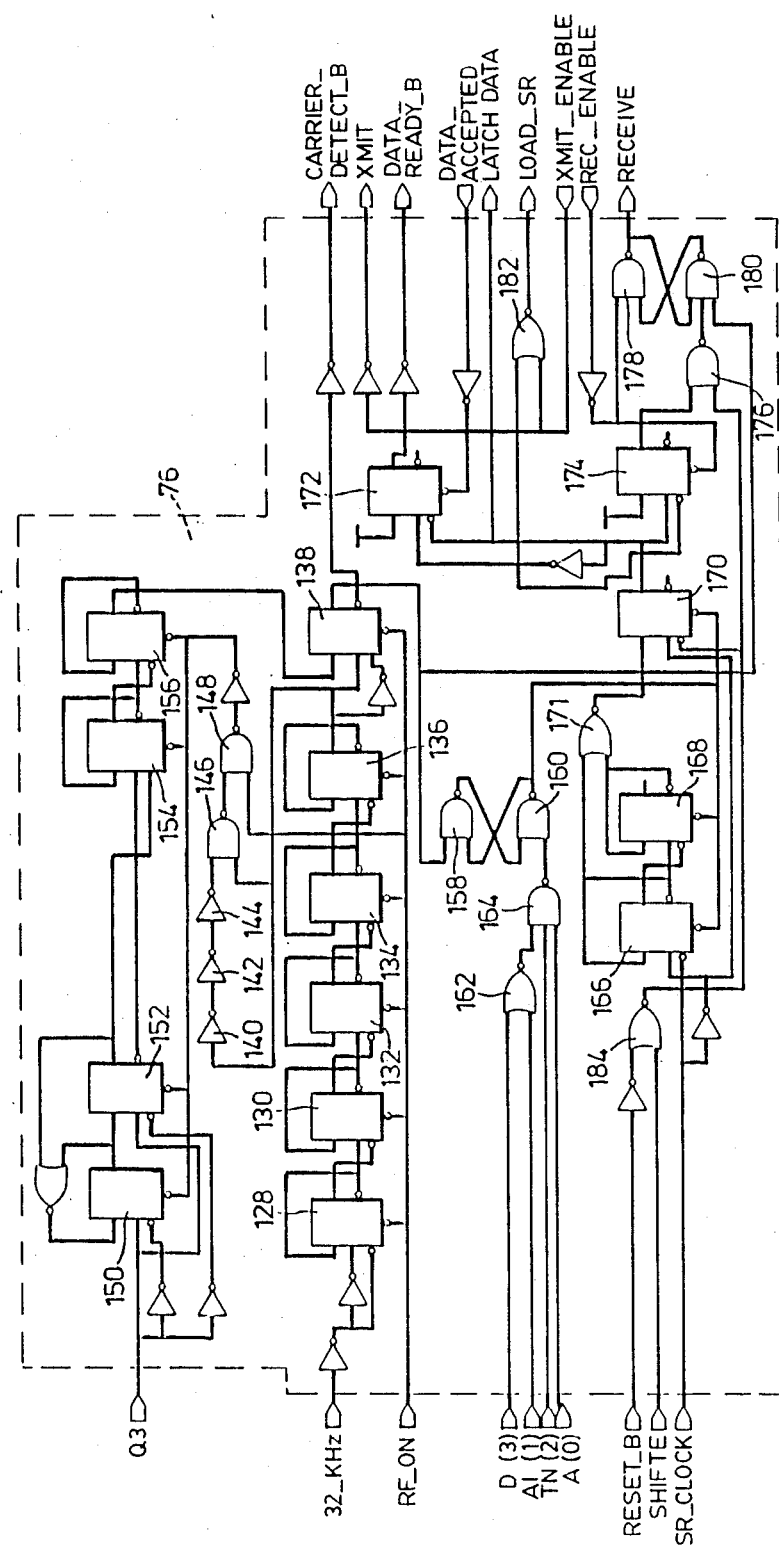
FIG. 13 is a more detailed schematic circuit diagram of the sync logic circuit of FIG. 4.

Referring now to the sync logic circuit of FIG. 13, the 32 kHz clock signal that is available from chip 68 is fed to a 5 flip-flop divider chain 128–136, the resultant square wave 1 kHz signal from final flip-flop 136 clocking a sixth flip-flop 138. The output of flip-flop 136 also feeds through a three inverter chain 140–144 providing a single inversion, the middle one of which is a slow inverter to also provide a time delay into NAND gate 146 which produces pulses corresponding to each pulse leading rising edge. A following NAND gate 148 is enabled by the "RF ON" signal and feeds these pulses as resets to a pulse counter chain of flip-flops 150–156, which further counts down the Q$_3$ signal that was originally the 132 kHz first reference signal to a frequency (0.6875 kHz) at which it can be compared with the 1 kHz signal derived from the chip clock. The flip-flop 138 is therefore the carrier detector and outputs on the respective terminal. At the same time it releases an RS flip-flop constituted by NAND gates 158 and 160, which is used to detect whether or not the password nibbles N1–N3 are valid (in this embodiment 005) so that the subsequent data nibbles will be accepted. In hexadecimal 5 is the number 0101 and when this correspondence is detected by the combination of NOR gate 162 and NAND gate 164 fed in at terminals D(0), D(1), D(2) and D(3) the RS flip-flop is set and in this state releases the three flip-flops 166, 168 and 170 to run. The two flip-flops 166 and 168 count the four bits of each nibble and feed flip-flop 170 through NOR gate 171, the flip-flop providing a 1-bit delay for timing purposes, its output being the latch signal exiting on the "LATCH" terminal so as to latch the nibble into the shift register. The latch signal also sets flip-flop 172 which gives the "DATA READY" signal to the chip 68 indicating that data is in the latch 78 ready for output from the latch; this flip-flop is reset by the chip by an input signal on "DATA ACCEPTED" after the data has been read by it. The latch signal from 170 also clocks the flip-flop 174 which, together with the NAND gates 176–180, comprise a circuit to synchronize the receive enable with the latch and ensure that it ceases at the required point in the base station word, namely at the end of nibble N12, the additional nibble N13 being provided to give redundancy. The transmit enable signal from the chip 68 is fed to a NOR gate 182 with this synchronize signal and results in the "LOAD S/R" signal for the shift register in order to shift each nibble from the register to the encoder. The "SHIFT E" signal from the encoder feeds into the sync logic and through NOR gate 184 to the flip-flop 170. The timing of the period T$_1$ (FIG. 7c) from the trailing edge of the data nibble N11 has been described above. A second shorter period T$_2$ (FIG. 7e) between the trailing edge of N11 and the beginning of transmit enable is the responsibility of the microprocessor chip; this is the period during which the microprocessor carries out its calculations and is not known as precisely as period T$_1$ and in this embodiment is approximately 44 milliseconds long and about 2 milliseconds shorter than T$_1$.

Figure 14:
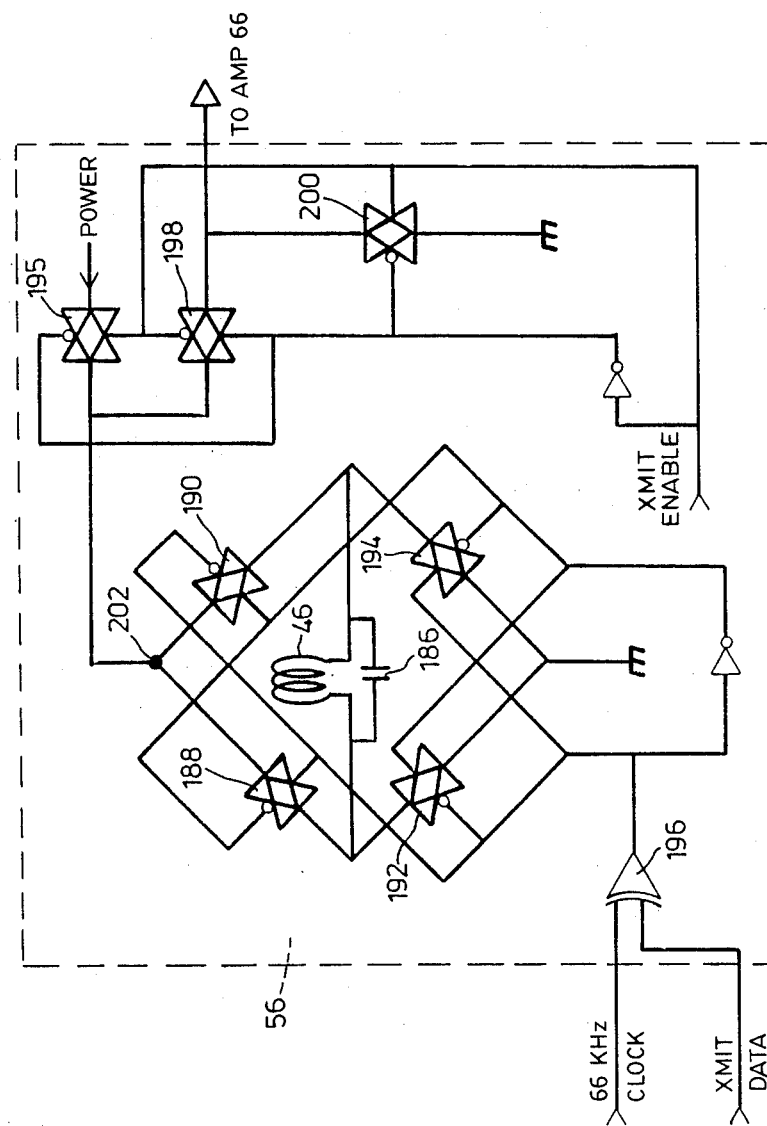
FIG. 14 is a more detailed schematic circuit diagram of the phase detector/modulator circuit of FIG. 4.

Referring now to FIG. 14, the phase detector and modulator 56 includes a timing capacitor 186 connected across the 66 kHz coil 46 between two junctions of a bridge formed by four transmission gates 188–194, the other two junctions being connected between ground and the "POWER ON" terminal via transmission gate 195. The gates are connected so that either the pair 190/192 or the pair 188/194 are conducting, so that depending on the pair that is conducting the corresponding end of the coil is grounded and the phase is reversed by 180°. The 66 kHz signal is fed to an exclusive OR gate 196 that also receives the XMIT DATA signal from the encoder 82 that in the receive mode is held low, whereupon the output is the same as the input, namely the 66 kHz signal multiplied by plus or minus one, which is applied to the bridge to demodulate the phase modulated 66 kHz signal received by the antenna 46. The circuit also includes two other transmission gates 198 and 200 and all three gates are controlled from the XMIT ENABLE terminal. Thus, when receiving, this is also held low whereupon devices 196 and 200 are disabled and device 198 is enabled, so that the demodulated signal at the junction 202 of the bridge is fed to the amplifier 66.

In the transmitting mode the XMIT ENABLE signal now is high and gates 196 and 200 are enabled; gate 198 is disabled so that amplifier 66 is connected to ground through gate 200 and no signal can be fed thereto. The word to be transmitted is fed in on XMIT DATA terminal; when the data signal is low the output of the exclusive OR gate 196 is the same as the input, again the 66 kHz clock signal; when the data signal is high the output is inverted, so the phase of the signal at 202 is modulated in accordance with the data and this is applied across the coil 46 which resonates and transmits it to the respective antenna segment.

Figure 15:
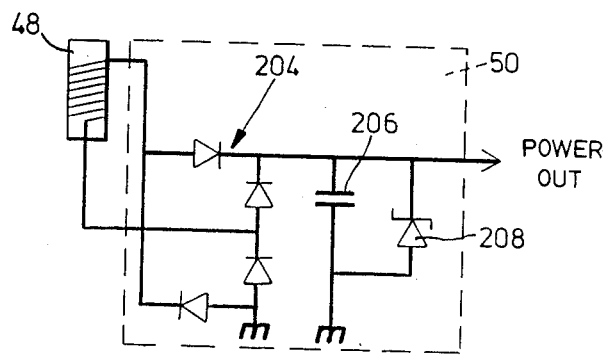
FIG. 15 is a circuit diagram of a chargeable circuit for replacement of the battery of the circuit of FIG. 4.

In the embodiment described above, the power source 50 for the module comprises a lithium battery of a capacity able to provide the average current drawn by the module circuits of about 5 microamps for about 3–5 years. An alternative source is illustrated by FIGS. 1 and 15, consisting of a rectifier bridge 204 in the module connected directly to the antenna 48 and supplying the energy thus received to charge a high value capacitor 206 whose maximum charge voltage is determined by a zener diode 208. It is now possible to obtain small relatively low cost capacitors of capacity as high as 1 Farad, and such a capacitor will provide a current of 5 microamps for a period of as long as a week, so that there is sufficient power to maintain the module RAMs even in the event of a power failure. Alternatively, the capacitor could be replaced by a battery of rechargeable type. The power to operate the charging circuit could be obtained from the base station transmitter 24, but instead a dedicated transmitter 210 may be provided for this purpose that is operated by the store computer during periods that the modules are not required.

Although the combination of an air-cored and a ferrite-cored module antenna has been described, it will be apparent that both antennae can be ferrite-cored; it will not usually be preferred to employ an air-cored antenna also for the reference signal for the reasons described above, and it becomes difficult to arrange two large air-cored antennae in a compact module casing because of the need for orthogonal disposition the two ferrite-cored antennae can be located in an "L" or "T" formation relative to each other.

Although in the systems described phase modulation has been employed, it is also possible to employ amplitude modulation of the second carrier.

We claim:

1. A signal broadcast system comprising a broadcast transmitter and at least one broadcast receiver, the system comprising:
    means for generating at the transmitter a first carrier of a first reference frequency N and for broadcasting that first carrier;
    means for generating at the transmitter a second carrier of second frequency N/n derived from the first reference carrier where the divisor n is greater than 1, for modulating the second carrier with a digital modulating signal in accordance with the digital information to be transmitted thereby, and for broadcasting the digitally modulated second carrier;
    means at the receiver for receiving the first carrier and for dividing it by the divisor n to produce a corresponding demodulating signal of frequency N/n; and
    a demodulator at the receiver receiving the second digitally modulated carrier and the demodulating signal and demodulating the second digitally modulated carrier with the second demodulating signal to generate a resulting digital information signal.

2. A system as claimed in claim 1 wherein the said first frequency N is in the range 10 kHz–500 kHz.

3. A system as claimed in claim 1, wherein the divisor is an even whole number integer.

4. A system as claimed in claim 1, wherein the said first frequency N is in the range 10 kHz–500 kHz and the divisor is 2.

5. A system as claimed in claim 1, wherein the said second carrier is phase modulated by the digital modulating signal.

6. A system as claimed in claim 1, wherein the digital modulating signal is a coded binary signal, and the said second carrier is phase modulated by the coded binary digital modulating signal.

7. A system as claimed in claim 1, wherein the said receiver also comprises means for generating a second carrier of reference frequency N/n and for transmitting said carrier; and the said transmitter also comprises receiving means for receiving the said second carrier from the receiver, and wherein the receiver in transmitting mode employs the said second carrier of frequency N/n to module the transmitted signal.

8. A signal communication system as claimed in claim 7, and comprising with each receiving means a visible display unit receiving the digital information signal and displaying information thereof.

9. A system as claimed in claim 1, wherein the transmitter is a base transmitter and also comprises receiving means for receiving said second carrier, and the receiver is a module receiver and also comprises means for generating a second carrier of frequency N/n and for transmitting said carrier wherein the said first carrier is generated at the base transmitter and transmitted therefrom in the form of sequential discrete envelopes;
    the base transmitter when transmitting generates a base data word to be transmitted, modulates the second carrier therewith and transmits the resultant modulated second carrier within the respective envelope;
    the receiving means at the module receiver detects the base data word and in response to its termination generates a timing period interposed between the received base data word and an associated module data word to be transmitted by the module receiver;
    the transmitting means at the module receiver modulates the second carrier with the module data word and transmits the resultant modulated second carrier at the termination of the timing period.

10. A system as claimed in claim 9, wherein the module receiver receives the said first carrier in the form of the said sequential discrete envelopes, and wherein the lengths of each base and respective module data word and the interposed timing period are such that the module data word terminates with a respective received first carrier envelope so that both the base and module data words are framed thereby.

11. A system as claimed in claim 10, wherein the receiving means of the transmitter detects in a received second carrier modulated by a module data word the leading edge of each module data word at the end of the respective timing period following the termination of the corresponding transmitter data word by reference to the transmission within the time period of the respective discrete envelope of the respective base data word and the respective timing period.

12. A signal communication system as claimed in claim 9, and comprising with each receiving means a visible display unit receiving the digital information signal and displaying information thereof.

13. A signal communication system as claimed in claim 1, and comprising with each receiving means a visible display unit receiving the digital information signal and displaying information thereof.

14. A signal communication system comprising a base transmitter including transmitting means and also including receiving means, and comprising a plurality of module receivers, each of which includes a respective receiving means and also a respective transmitting means;
    the transmitting means of the base transmitter including means for generating a first carrier of a first reference frequency N and for transmitting that first carrier respectively to the receiving means of the module receivers;
    each transmitting means of the base transmitter and the module receiver also including means for generating when transmitting a second carrier of second frequency N/n derived from the first reference carrier, where the divisor n is greater than 1, means for modulating the respective second carrier with a respective digital modulating signal in accordance with digital information to be transmitted respectively from the base transmitter and the module receivers, and means for transmitting the digitally modulated second carrier therefrom;

dividing means at each receiving means receiving the first carrier from the respective transmitting means and dividing it by the divisor n to produce a corresponding demodulating signal of frequency N/n; and a demodulator at each receiving means receiving the respective second digitally modulated carrier and the demodulating signal and demodulating the second digitally modulated carrier with the demodulating signal to generate a resulting digital information signal.

15. A system as claimed in claim 14, wherein the said first frequency N is in the range 10 kHz–500 kHz.

16. A system as claimed in claim 14, wherein the divisor is an even whole number integer.

17. A system as claimed in claim 14, wherein said second carrier is phase modulated by a digital modulating signal.

18. A system as claimed in claim 14, wherein said second carrier is phase modulated by a coded binary digital modulating signal.

19. A signal communication system as claimed in claim 14, and comprising with each receiving means a visible display unit receiving the digital information signal and displaying information thereof.

20. A signal communication system comprising a base transmitter including transmitting means and also including receiving means, and comprising a plurality of module receivers, each of which includes a respective receiving means and also a respective transmitting means;

the transmitting means of the base transmitter including means for generating a first carrier of a first reference frequency N and for transmitting that first carrier respectively to the receiving means of the module receivers, wherein the said first carrier is generated at the base transmission means and transmitted therefrom in the form of sequential discrete envelopes;

each transmitting means of the base transmitter and the module receiver also including means for generating when transmitting a second carrier of second frequency N/n derived from the first reference carrier, where the divisor n is greater than 1, for generating a data word to be transmitted thereby, means for modulating the second carrier with the said data word, and means for transmitting the resultant modulated second carrier therefrom;

dividing means at each receiving means receiving the first carrier from the respective transmitting means and dividing it by the divisor n to produce a corresponding demodulating signal of frequency N/n; and a demodulator at each receiving means receiving the respective second digitally modulated carrier and the demodulating signal and demodulating the second digitally modulated carrier with the demodulating signal to generate a resulting data word;

the receiving means at each module receiver detecting each received data word and the module receiver in response t its termination generating a timing period of length such that the sum of the length of the received data word, the length of the timing period and the length of a module data word to be transmitted by the module transmitting means is equal to the length of a respective envelope of said first carrier frequency;

the transmitting means at the module receiver modulating the respective second carrier with its data word to be transmitted and transmitting the resultant, modulated second carrier at the termination of the said timing period.

21. A system as claimed in claim 20, wherein the broadcast transmitter in receiver mode detects the leading edge of the module data word at the end of said timing period following the termination of the broadcast transmitter data word by reference to the transmission of the base data word and the timing period.

22. A system as claimed in claim 20, wherein the said first frequency N is in the range 10 kHz–500 kHz.

23. A system as claimed in claim 20, wherein the divisor is an even whole number integer.

24. A system as claimed in claim 20, wherein he said second carrier is phase modulated by a digital modulating signal.

25. A system as claimed in claim 20, wherein the said second carrier is phase modulated by a coded binary signal modulating signal.

26. A signal communication system as claimed in claim 20, and comprising with each receiving means a visible display unit receiving the digital information signal and displaying information thereof.

* * * * *